(12) United States Patent
Gou et al.

(10) Patent No.: US 11,558,856 B2
(45) Date of Patent: *Jan. 17, 2023

(54) METHOD AND APPARATUS FOR TRANSMISSION OR RECEPTION USING BEAMFORMING IN A WIRELESS COMMUNICATION SYSTEM

(71) Applicant: ASUSTek Computer Inc., Taipei (TW)

(72) Inventors: Yu-Hsuan Gou, Taipei (TW); Richard Lee-Chee Kuo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 45 days.

This patent is subject to a terminal disclaimer.

(21) Appl. No.: 17/109,337

(22) Filed: Dec. 2, 2020

(65) Prior Publication Data

US 2021/0092724 A1 Mar. 25, 2021

Related U.S. Application Data

(63) Continuation of application No. 15/656,882, filed on Jul. 21, 2017, now Pat. No. 10,887,868.

(Continued)

(51) Int. Cl.
*H04W 16/28* (2009.01)
*H04B 7/06* (2006.01)
(Continued)

(52) U.S. Cl.
CPC ...... *H04W 72/0406* (2013.01); *H04B 7/0408* (2013.01); *H04B 7/0413* (2013.01);
(Continued)

(58) Field of Classification Search
None
See application file for complete search history.

(56) References Cited

U.S. PATENT DOCUMENTS

| 2010/0075705 | A1 | 3/2010 | van Rensburg et al. |
| 2011/0085448 | A1 | 4/2011 | Kuwahara |

(Continued)

FOREIGN PATENT DOCUMENTS

| JP | 2009500967 A | 1/2009 |
| JP | 2014522194 A | 8/2014 |

(Continued)

OTHER PUBLICATIONS

Corresponding Chinese Patent Application No. 201710600725.8 Office Action, dated May 29, 2020. English translation.

(Continued)

*Primary Examiner* — Ajit Patel
(74) *Attorney, Agent, or Firm* — Cooper Legal Group LLC

(57) ABSTRACT

Methods and apparatuses for transmission or reception using beamforming in a wireless communication system are disclosed herein. In one method, a user equipment receives a second signal indicating a first information. The UE derives at least one specific UE beam based on the first information. The UE uses the at least one specific UE beam to receive or transmit at least one transmission, in which the at least one transmission is periodic channel state indication, scheduling request, and/or scheduling information for downlink assignment or uplink resource.

16 Claims, 19 Drawing Sheets

Related U.S. Application Data

(60) Provisional application No. 62/365,540, filed on Jul. 22, 2016.

(51) Int. Cl.

| | | |
|---|---|---|
| *H04W 72/04* | (2009.01) | |
| *H04B 7/08* | (2006.01) | |
| *H04B 7/0408* | (2017.01) | |
| *H04B 7/0413* | (2017.01) | |
| *H04L 5/00* | (2006.01) | |
| *H04W 72/12* | (2009.01) | |
| *H04W 88/08* | (2009.01) | |

(52) U.S. Cl.
CPC ........... *H04B 7/0695* (2013.01); *H04B 7/088* (2013.01); *H04L 5/0048* (2013.01); *H04W 16/28* (2013.01); *H04W 72/048* (2013.01); *H04W 72/1284* (2013.01); *H04W 72/046* (2013.01); *H04W 72/0446* (2013.01); *H04W 88/08* (2013.01)

(56) References Cited

U.S. PATENT DOCUMENTS

| | | | |
|---|---|---|---|
| 2013/0223487 A1 | 8/2013 | Zhou | |
| 2013/0286960 A1 | 10/2013 | Li | |
| 2014/0211731 A1 | 7/2014 | Inoue et al. | |
| 2015/0085819 A1 | 3/2015 | Kishiyama et al. | |
| 2015/0195070 A1 | 7/2015 | Kim et al. | |
| 2015/0236774 A1 | 8/2015 | Son et al. | |
| 2016/0119043 A1 | 4/2016 | Rajagopal et al. | |
| 2016/0149617 A1* | 5/2016 | Zhu | H04L 5/0057 375/267 |
| 2017/0026938 A1 | 1/2017 | Onggosanusi et al. | |
| 2017/0289867 A1* | 10/2017 | Fan | H04W 36/0088 |
| 2017/0311353 A1* | 10/2017 | Liu | H04B 7/063 |
| 2018/0006696 A1 | 1/2018 | Yue et al. | |
| 2018/0006706 A1* | 1/2018 | Cheng | H04B 7/0617 |
| 2018/0062770 A1 | 3/2018 | Reial et al. | |
| 2018/0109303 A1* | 4/2018 | Yoo | H04B 7/0617 |
| 2018/0160421 A1 | 6/2018 | Suzuki et al. | |
| 2018/0242285 A1 | 8/2018 | Yoo et al. | |
| 2018/0242300 A1 | 8/2018 | Hakola et al. | |
| 2018/0309526 A1 | 10/2018 | Zhang et al. | |
| 2018/0359790 A1 | 12/2018 | Ingale et al. | |
| 2019/0053220 A1 | 2/2019 | Zhang et al. | |
| 2019/0058518 A1 | 2/2019 | Koskela et al. | |
| 2019/0081672 A1* | 3/2019 | Hwang | H04B 7/0486 |
| 2019/0104549 A1 | 4/2019 | Deng et al. | |

FOREIGN PATENT DOCUMENTS

| | | |
|---|---|---|
| JP | 2015508609 A | 3/2015 |
| JP | 2015523757 A | 8/2015 |
| WO | 2015137447 A1 | 9/2015 |
| WO | 2015147592 A1 | 10/2015 |
| WO | 20160186144 A1 | 6/2016 |

OTHER PUBLICATIONS

Corresponding Japanese Patent Application No. 2017-141428, Office Action dated Feb. 26, 2019. English translation.

Corresponding European Patent Application No. 17182556.5 European Search Report dated Dec. 20, 2017.

Corresponding Korean Patent Application No. 10-2017-0092840, Office Action dated Sep. 27, 2018.English translation.

Corresponding Japanese Patent Application No. 2017-141428, Office Action dated Aug. 28, 2018. English translation.

* cited by examiner

Different deployment scenarios with Single TRP cell

Different deployment scenarios with multiple TRPs cell

METHOD AND APPARATUS FOR TRANSMISSION OR RECEPTION USING BEAMFORMING IN A WIRELESS COMMUNICATION SYSTEM

CROSS REFERENCE TO RELATED APPLICATION

The present Application claims priority to and is a continuation of U.S. application Ser. No. 15/656,882, filed on Jul. 21, 2017, entitled "METHOD AND APPARATUS FOR TRANSMISSION OR RECEPTION USING BEAMFORMING IN A WIRELESS COMMUNICATION SYSTEM", which claims the benefit of U.S. Provisional Patent Application Ser. No. 62/365,540 filed on Jul. 22, 2016. The entire disclosure of U.S. application Ser. No. 15/656,882 and the entire disclosure of U.S. Provisional Patent Application Ser. No. 62/365,540 are incorporated herein in their entirety by reference.

FIELD

This disclosure generally relates to wireless communication networks, and more particularly, to a method and apparatus for transmission or reception using beamforming in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for transmission or reception using beamforming in a wireless communication system are disclosed herein. In one method, a user equipment receives a second signal indicating a first information. The UE derives at least one specific UE beam based on the first information. The UE uses the at least one specific UE beam to receive or transmit at least one transmission, in which the at least one transmission is periodic channel state indication, scheduling request, and/or scheduling information for downlink assignment or uplink resource. UE beam(s) to be used for transmissions via pre-determined radio resources can be controlled efficiently.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; R3-160947, TR 38.801 V0.1.0, "Study on New Radio Access Technology; Radio Access Architecture and Interfaces"; R2-164306, "Summary of email discussion [93bis #23][NR] Deployment scenarios"; RAN2 #94 meeting minute; R2-163879, "RAN2 Impacts in HF-NR"; R2-162210, "Beam level management<->Cell level mobility"; R2-163471, "Cell concept in NR"; R2-164270, "General considerations on LTE-NR tight interworking"; R2-162251, "RAN2 aspects of high frequency New RAT"; R1-165364, "Support for Beam Based Common Control Plane"; and TS 36.321 V13.0.0, "Medium Access Control (MAC) protocol specification". The standards and documents listed above are hereby expressly incorporated by reference in their entirety.

Figure 1:
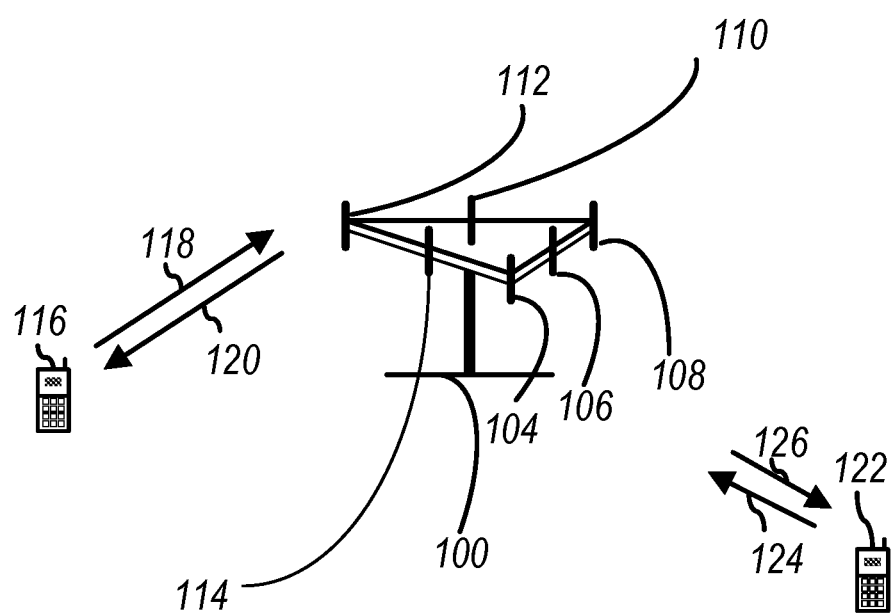
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
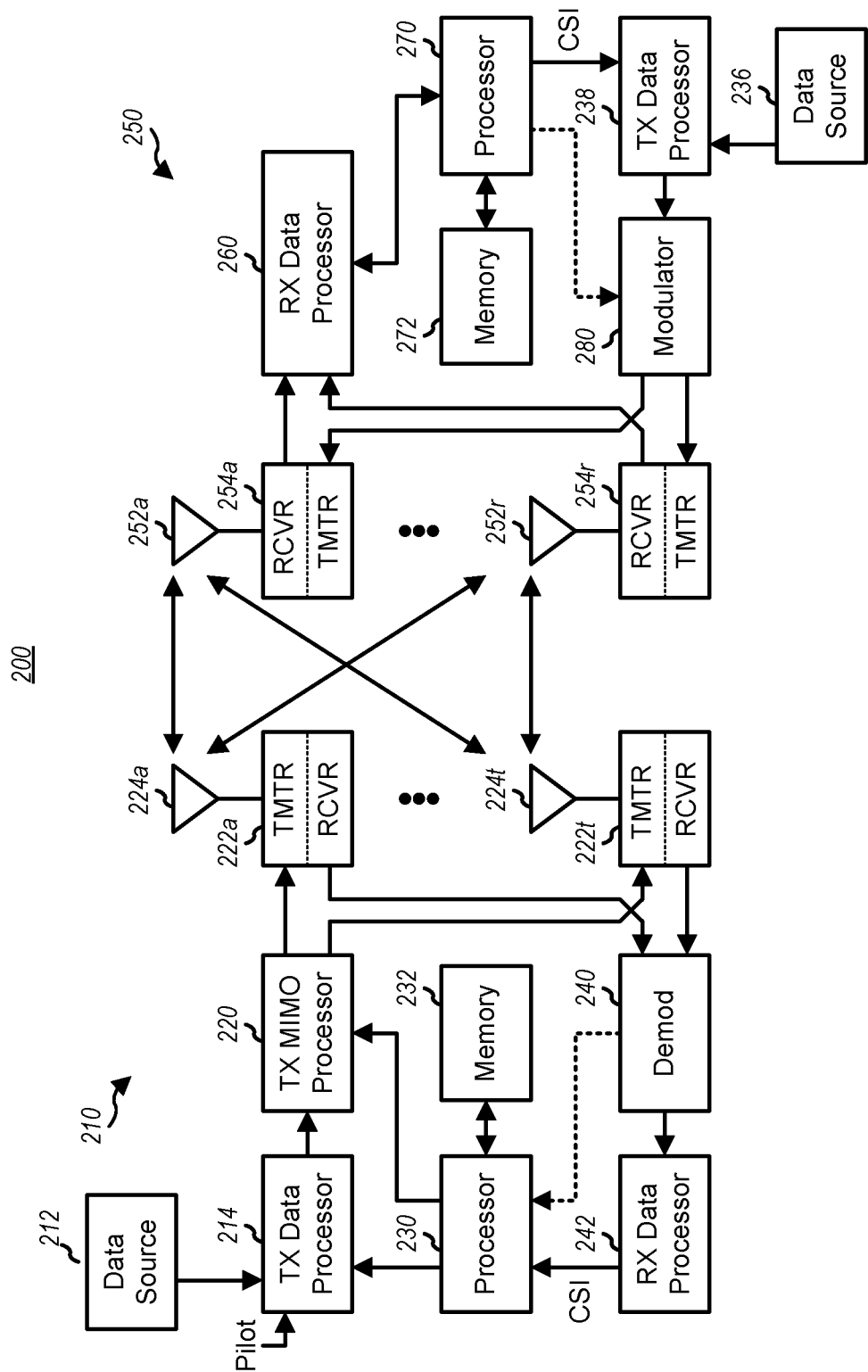
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
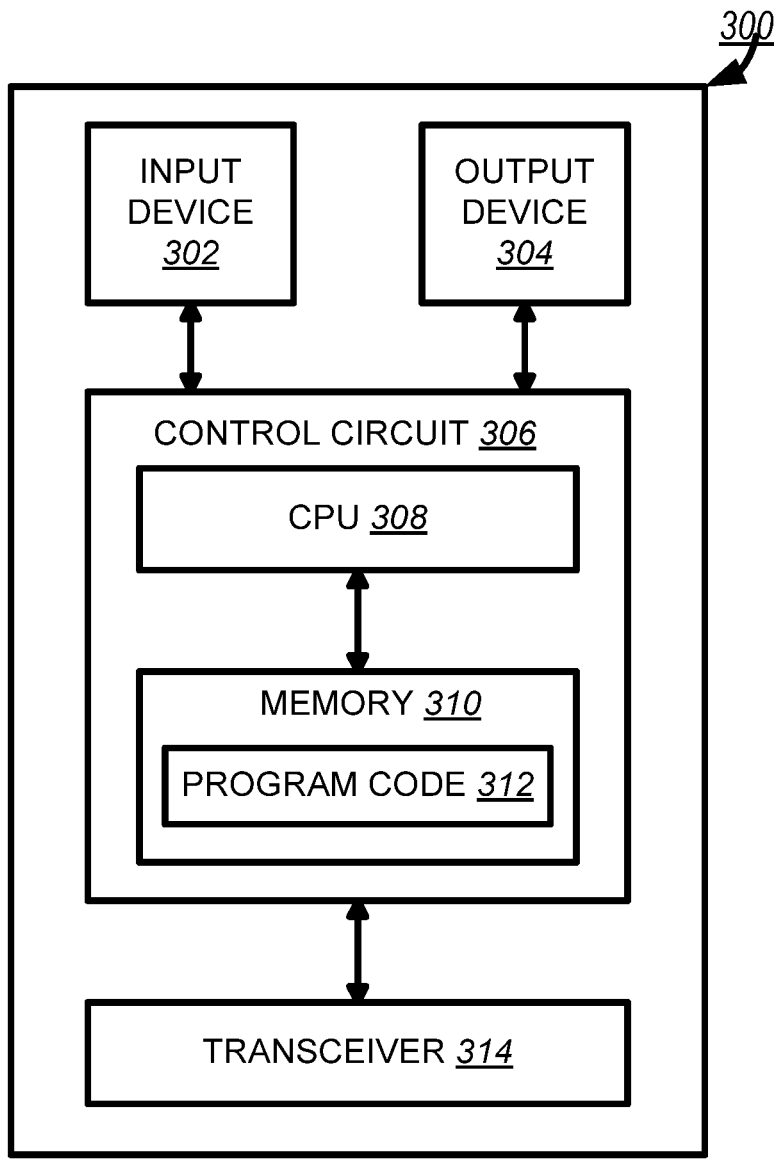
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
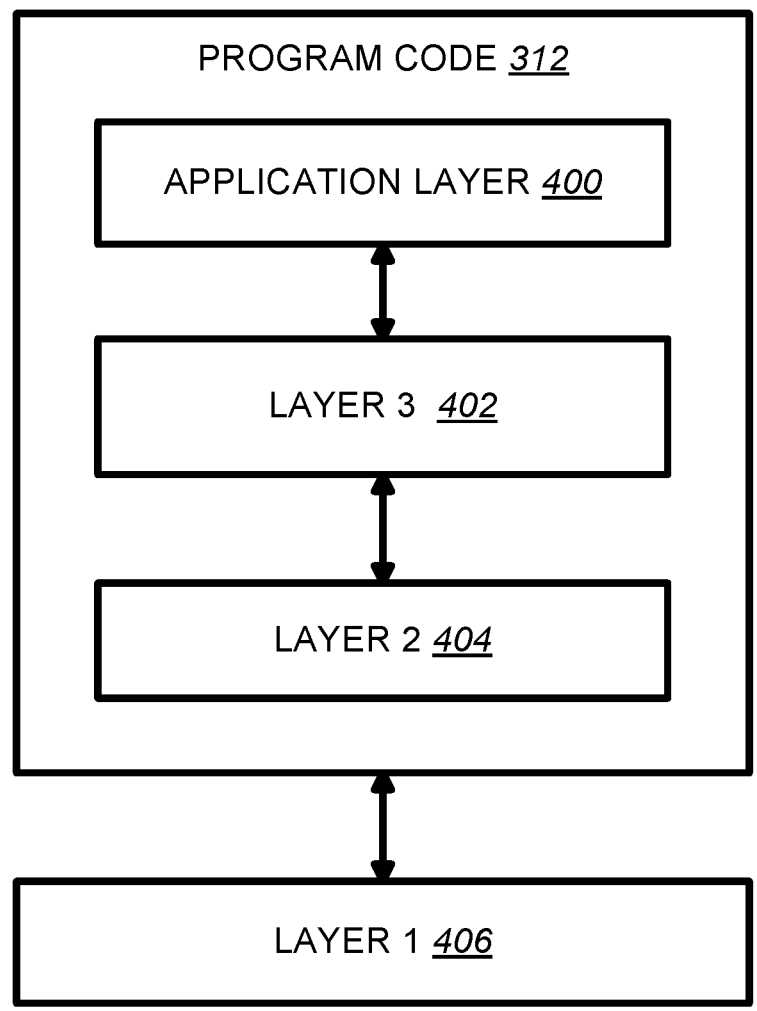
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020: eMBB (enhanced Mobile Broadband); mMTC (massive Machine Type Communications); and URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g. current LTE bands<6 GHz), the required cell coverage may be provided by forming a wide sector beam for transmitting downlink common channels. However, utilizing wide sector beam on higher frequencies (>>6 GHz), cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
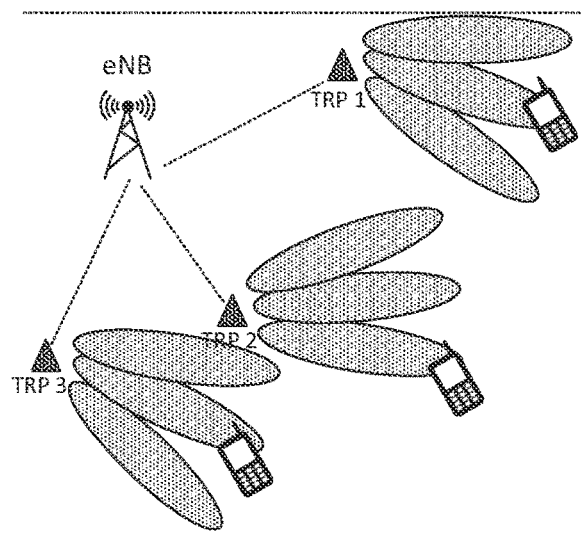
FIG. 5 illustrates a beam concept in 5G.

Based on 3GPP R2-162709 and as shown in FIG. 5, an evolved Node B may have multiple Transmission/Reception Points (TRPs) that are either centralized or distributed. Each TRP can form multiple beams. The number of beams and the number of simultaneous beams in the time/frequency domain depend on the number of antenna array elements and the RF at the TRP.

Potential mobility type for New RAT (NR) can be listed: intra-TRP mobility; inter-TRP mobility; and inter-NR eNB mobility.

Based on 3GPP R2-162762, the reliability of a system that relies on beamforming and operating in higher frequencies may be challenging because coverage may be be more sensitive to both time and space variations. As a consequence, the signal-to-interference plus noise ratio (SINR) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker as compared to wide area coverage as provided by LTE.

Figure 6:
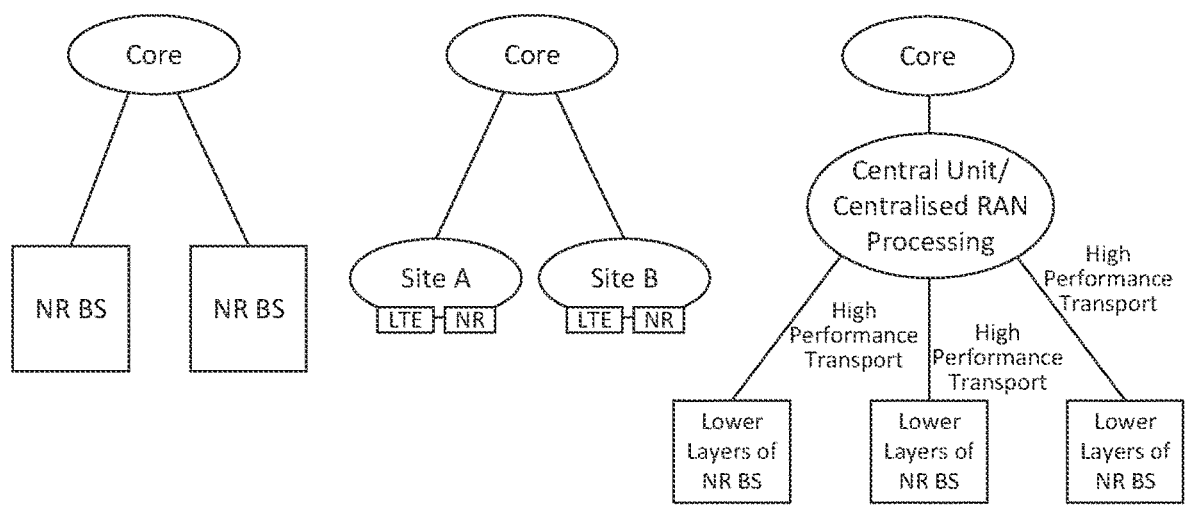
FIG. 6 illustrates stand-alone, co-sited with LTE, and centralized baseband networks.
Figure 7:
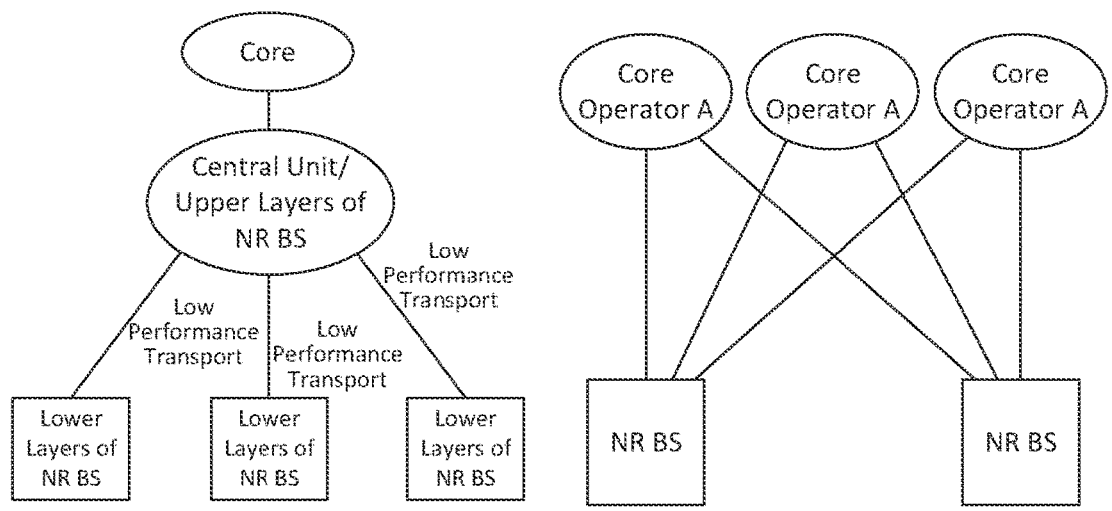
FIG. 7 illustrates a network having centralized with lower performance transport and Shared RAN.

Based on 3GPP R3-160947, TR 38.801 V0.1.0, the scenarios illustrated in FIGS. 6 and 7 should be considered for support by the NR radio network architecture.

Based on R2-164306, the following scenarios in terms of cell layout for standalone NR are captured to be studied: macro cell only deployment; heterogeneous deployment; and small cell only deployment.

Based on 3GPP RAN2 #94 meeting minute, one NR eNB corresponds to one or many TRPs. Two levels of network controlled mobility: RRC driven at 'cell' level; and zero/minimum RRC involvement (e.g. at MAC/PHY).

Based on 3GPP R2-162210, in 5G, the principle of 2-level mobility handling may possibly be kept:
A) Cell level mobility
   a. Cell selection/reselection in IDLE, handover in the connected state (CONN)
   b. Handled by Radio Resource Control (RRC) in CONN state
B) Beam level management
   a. L1 handles appropriate selection of the TRP to use for a UE and the optimal beam direction 5G systems are expected to rely more heavily on "beam based mobility" to handle UE mobility, in addition to regular handover based UE mobility. Technologies like Multiple Input Multiple Output (MIMO), fronthauling, Cloud RAN (C-RAN) and Network Function Virtualization (NFV) will allow the coverage area controlled by one "5G Node" to grow, thus increasing the possibilities for beam level management and reducing the need for cell level mobility. All mobility within the coverage area of one 5G node could in theory be handled based on beam level management, which would leave handovers only to be used for mobility to the coverage area of another 5G Node.

Figure 8:
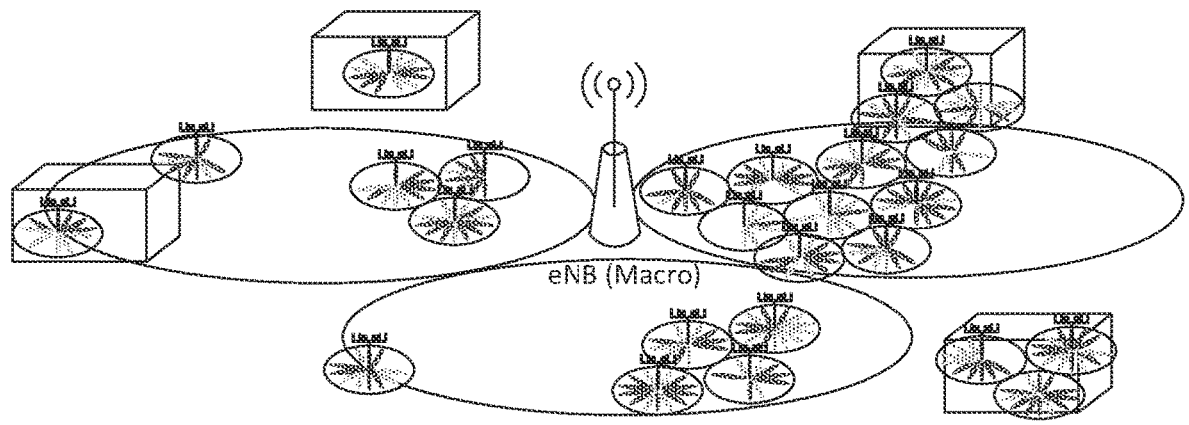
FIG. 8 illustrates different deployment scenarios with a single TRP cell.
Figure 9:
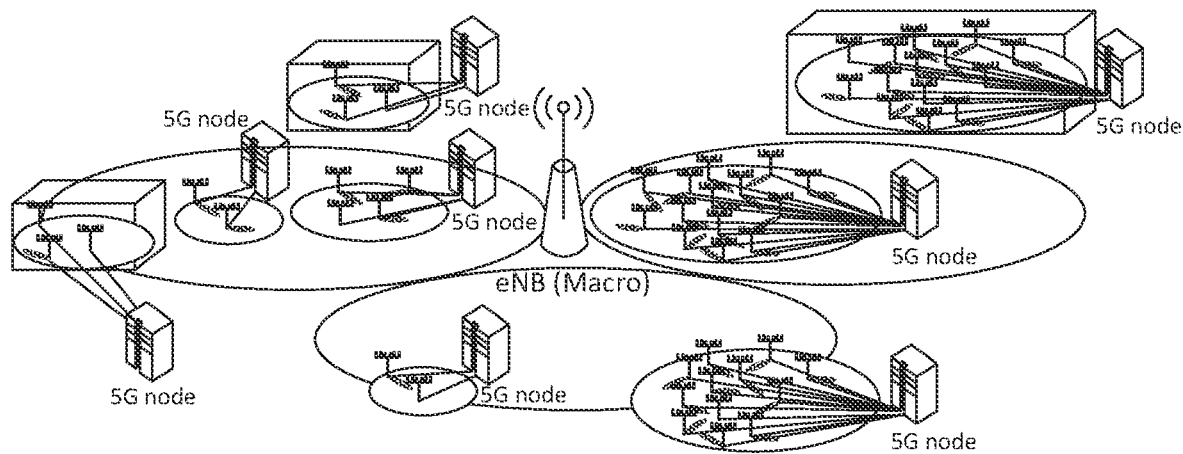
FIG. 9 illustrates different deployment scenarios with multiple TRP cells.
Figure 10:
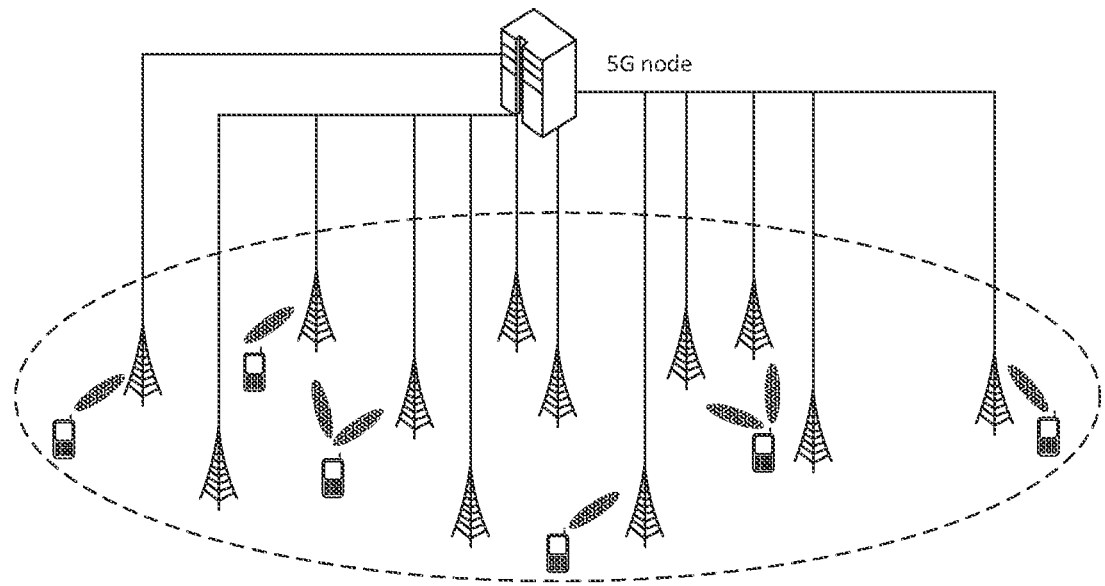
FIG. 10 illustrates a 5G cell having a 5G node with multiple TRPs.
Figure 11:
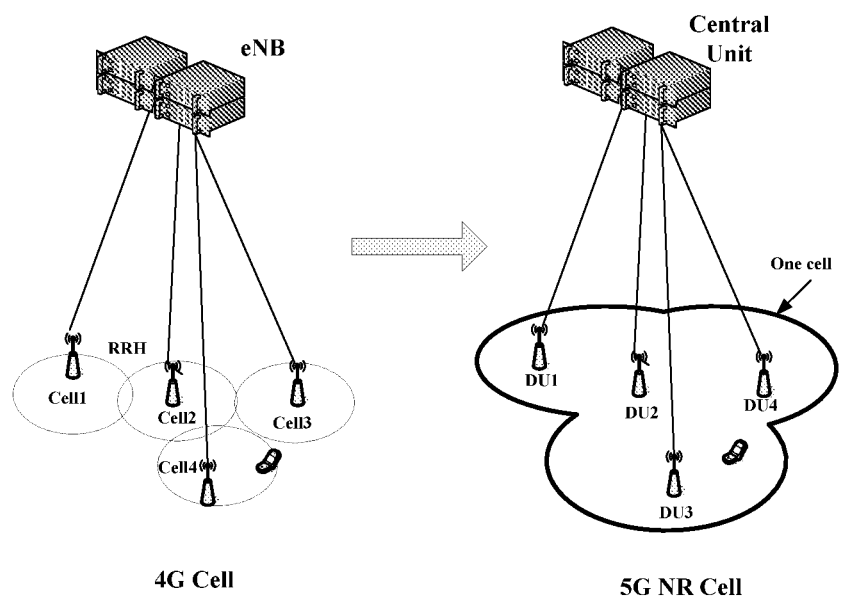
FIG. 11 illustrates a comparison between a LTE cell and a NR cell.

FIGS. 8-11 illustrate some examples of the concept of a cell in 5G NR. FIG. 8 illustrates a deployment with single TRP cell. FIG. 9 illustrates a deployment with multiple TRP cells. FIG. 10 illustrates one 5G cell comprising a 5G node with multiple TRPs. FIG. 11 illustrates a comparison between a LTE cell and a NR cell.

Apart from the handover based on a Radio Resource Management (RRM) measurement, a 5G UE should be able to adapt the serving beam to maintain 5G connectivity subject to beam quality fluctuation or UE intra-cell mobility. In order to accomplish this, a 5G Node-B and UE should be able to track and change the serving beam properly (called beam tracking hereafter).

The following terminology and assumption may be used hereafter:
  Base Station (BS): a network central unit in NR which is used to control one or multiple TRPs which are associated with one or multiple cells. Communication between BS and TRP(s) is via fronthaul. A BS could also be referred to as a central unit (CU), eNB, or NodeB.
  TRP: a transmission and reception point provides network coverage and directly communicates with UEs. TRP could also be referred to as distributed unit (DU).
  Cell: a cell is composed of one or multiple associated TRPs, i.e. coverage of the cell is composed of coverage of all associated TRP(s). One cell is controlled by one BS. A Cell could also be referred to as a TRP group (TRPG).
  Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.
  Beam sweeping number: necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.
  Serving beam: serving beam for a UE is a beam generated by network, e.g. TRP, which is used to communicate with the UE, e.g. for transmission and/or reception.

The following assumptions for network side may be used hereafter:
  NR using beamforming could be standalone, i.e. UE can directly camp on or connect to NR.
    NR using beamforming and NR not using beamforming could coexist, e.g. in different cells.
  TRP would apply beamforming to both data and control signaling transmissions and receptions.
    The number of beams generated concurrently by TRP depends on TRP capability, e.g. the maximum number of beams generated concurrently by different TRPs may be different.
    Beam sweeping is necessary in order, for example, for the control signaling to be provided in every direction.
    TRP may not support all beam combinations, e.g. some beams may not be generated concurrently.
  Downlink timing of TRPs in the same cell are synchronized.
  RRC layer of network side is in BS.
  TRP should support both UEs with UE beamforming and UEs without UE beamforming, e.g. due to different UE capabilities or UE releases.

The following assumptions for UE side may be used hereafter:
  UE may perform beamforming for reception and/or transmission, if possible and beneficial.
    The number of beams generated concurrently by UE depends on UE capability, e.g. generating more than one beam is possible.
    The beam(s) generated by UE is wider than beam(s) generated by the eNB.
    Beam sweeping for transmission and/or reception is generally not necessary for user data but may be necessary for other signaling, e.g. to perform measurement.
    UEs may not support all beam combinations, e.g. some beams could not be generated concurrently.
  Not every UE supports UE beamforming, e.g. due to UE capability or UE beamforming is not supported in NR first (few) release(s).
  For one UE, it may be possible to generate multiple UE beams concurrently and to be served by multiple serving beams from one or multiple TRPs of the same cell.
    Same or different (DL or UL) data could be transmitted on the same radio resource via different beams for diversity or throughput gain.
  There are at least two UE (RRC) states: connected state (or called active state) and non-connected state (or called inactive state or idle state).

Figure 12:
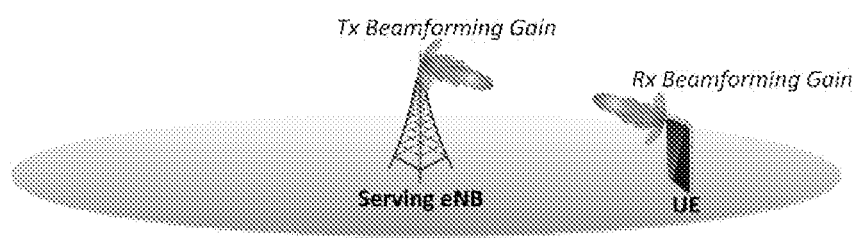
FIG. 12 illustrates gain compensation by beamforming in a HF-NR system.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 12 (reproduced from 3GPP R2-162251) illustrates gain compensation by beamforming.

Figure 13:
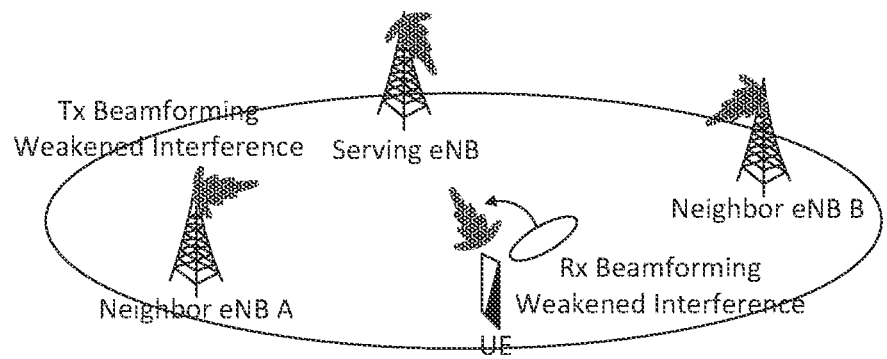
FIG. 13 illustrates weakened interference by beamforming in a HF-NR system.

In SINR perspective, sharp beamforming reduces interference power from neighbor interferers, i.e. neighbor eNBs in downlink case or other UEs connected to neighbor eNBs. In the transmission (TX) beamforming case, only interference from other TXs whose current beam points the same direction to the reception (RX) will be the "effective" interference. The "effective" interference means that the interference power is higher than the effective noise power. In RX beamforming case, only interference from other TXs whose beam direction is the same to the UE's current RX beam direction will be the effective interference. FIG. 13 (reproduced from 3GPP R2-162251) illustrates weakened interference by beamforming.

Figure 14:
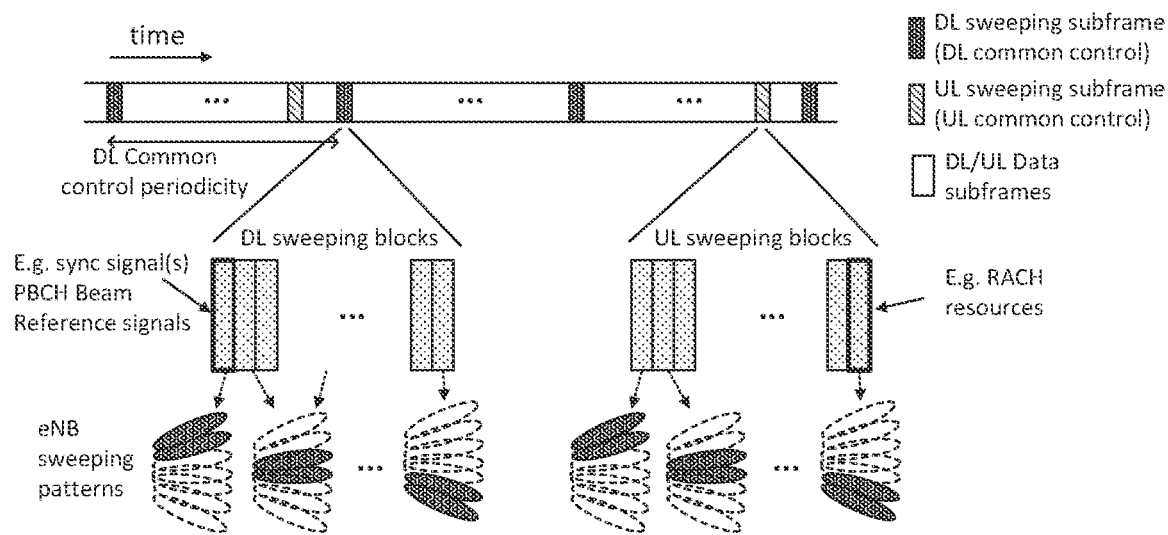
FIG. 14 illustrates a principle of a sweeping subframe.

Based on 3GPP R1-165364, it is proposed to concentrate sweeping common control plane functionality into specific subframes, called as sweeping subframes. The common control signaling to be transmitted in sweeping subframe includes synchronization signal (downlink (DL)), reference signal (DL), system information (DL), random access channel (UL), or the like. FIG. 14 (reproduced from 3GPP R1-165364) illustrates the principle of sweeping subframe.

One of the main use cases of downlink sweeping is downlink discovery signaling. Downlink discovery signaling includes, but is not limited to, signals for cell search, time and frequency synchronization acquisition, essential system information signalling and cell/beam measurements (e.g. RRM measurements).

Figure 15:
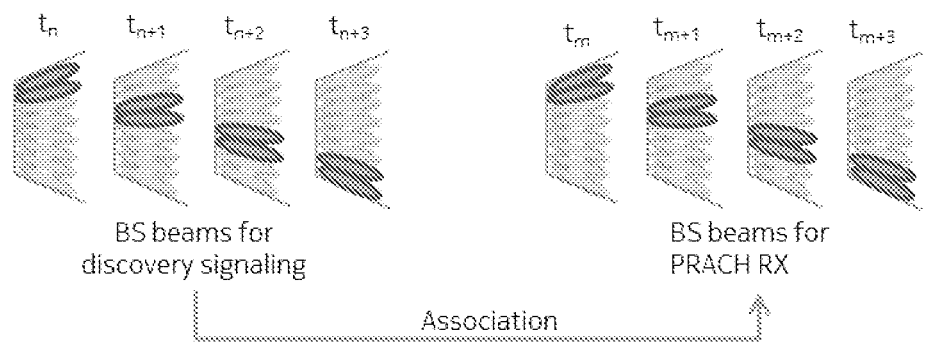
FIG. 15 illustrates one association between base station beams and PRACH resources.

For uplink Physical Random Access Channel (PRACH), the high level concept is to utilize BS beam reciprocity and enable the UE to transmit a PRACH preamble when the BS is receiving or using beam(s) with high array gain towards the transmitting UE. In other words, PRACH resources are associated with BS beams which are advertised periodically through DL discovery signaling, which conveys beam specific reference signals. FIG. 15 (reproduced from 3GPP R1-165364) illustrates the association between BS beams and PRACH resources.

Figure 16:
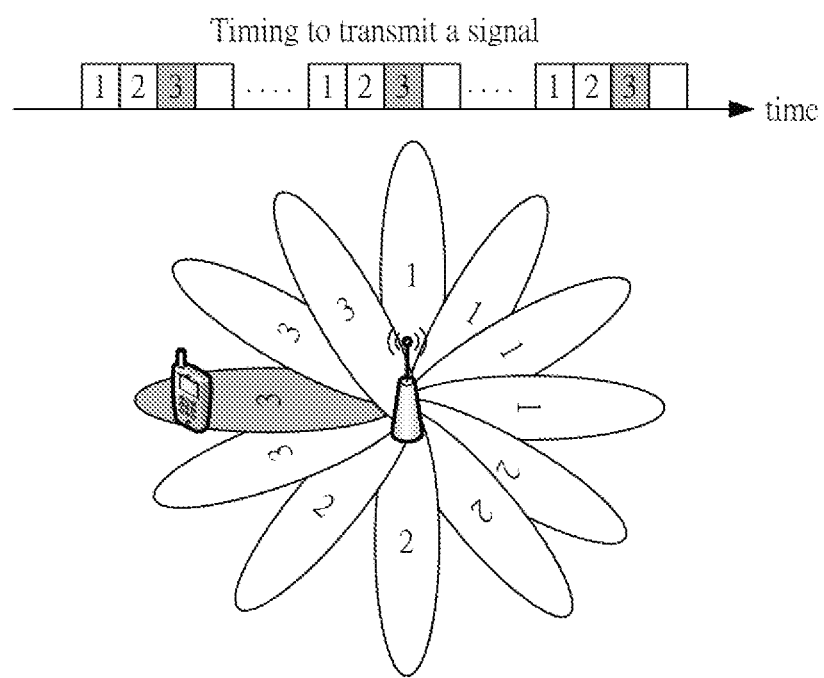
FIG. 16 illustrates one example of beam sweeping.

Since high gain beams are narrow and the number of concurrent high gain beams that can be formed may depend on cost and complexity of the utilized transceiver architecture, beam sweeping is needed for a number of times, e.g. beam sweeping number, in order to cover all possible directions for transmission and/or reception. For example, in FIG. 16, the TRP takes three time intervals to cover all directions and four beams are generated at each time interval by this TRP.

Signaling for transmission and/or reception, which needs to cover the whole cell coverage by beam sweeping, may include, but not limited to, one or more of the following: synchronization signal(s), reference signal(s), system information, paging, signal to initiate random access procedure, signals of random access procedure (e.g. random access preamble, random access response, contention resolution), or signal for DL/UL scheduling. For downlink signaling, beam sweeping is performed by a TRP for transmission and/or by a UE for reception. For uplink signaling, beam sweeping is performed by a UE for transmission and/or by a TRP for reception.

When the UE is in connected state, e.g. without data communication between network and UE for a period of time, the UE may initiate an UL transmission upon new data arrival.

A case of UL data transmission may have the following steps:
Request for scheduling
  When the UE has UL data available for transmission and has no UL resource used to transmit the UL data, the UE should be able to request UL resource for the data transmission by a request transmitted from the UE to network. UL timing of the UE may or may not be synchronized when the UE transmits the request. TRP(s) receives the request by beamforming.
UL resource scheduling
  When network, e.g. BS or TRP, receives the request, network may schedule proper UL resource for the UE to perform UL transmission. UL timing of the UE may be adjusted together with UL resource scheduling. The UL resource scheduling is provided by beamforming.
UL data transmission
  After the UE receives UL resource scheduling, the UE uses the UL resource to transmit pending UL data. TRP uses beamforming to receive the UL transmission from the UE.

And network, e.g. BS or TRP, may provide Hybrid Automatic Repeat Request (HARQ) feedback to the UE to indicate whether UL transmission is successfully received. The UE may need to perform retransmission if network fails to receive the UL transmission.

Figure 17:
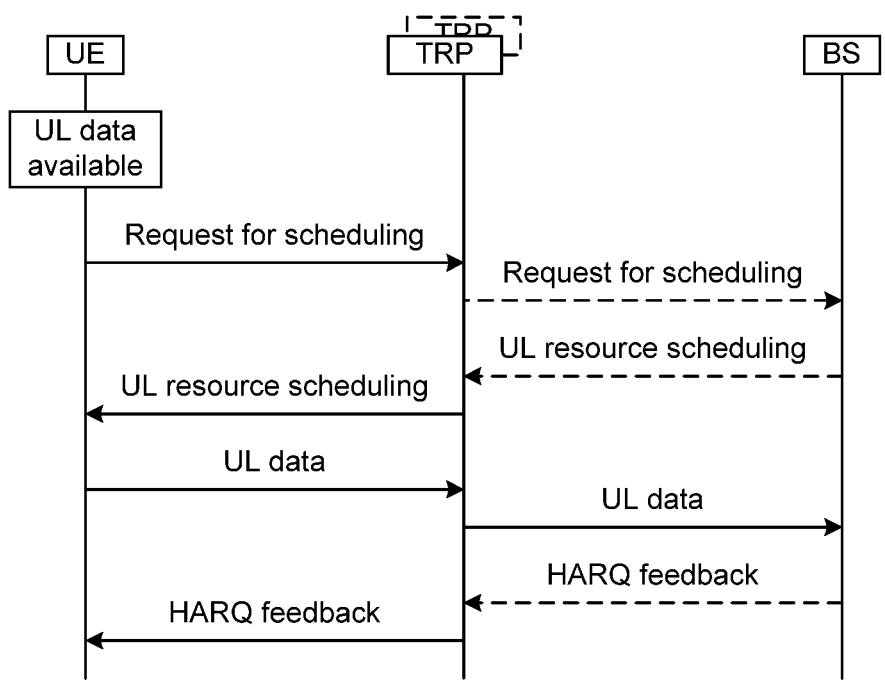
FIG. 17 illustrates one example of a flow chart for uplink transmission.

FIG. 17 illustrates an example of a flow chart for UL data transmission.

When the UE is in connected state, e.g. without data communication between network and UE for a period of time, the BS may initiate a DL transmission upon new data arrival.

A case of DL data transmission has the following steps:
Preparation before DL transmission
  When network has DL data to be transmitted to the UE, the network should determine the TRP(s) and the beam(s) to reach the UE. UL timing of the UE should be synchronized before DL transmission.
Transmission of DL assignment and DL data
  The network, e.g. the BS or the TRP, decides the proper DL resource for transmission of the DL data and informs the UE, via a DL assignment, to receive the DL data. The DL assignment and DL data are provided by beamforming in beam(s) which can reach the UE.
  The UE would provide HARQ feedback to the network to indicate whether DL transmission is successfully received. The network may need to perform retransmission if the UE fails to receive the DL transmission.

Figure 18:
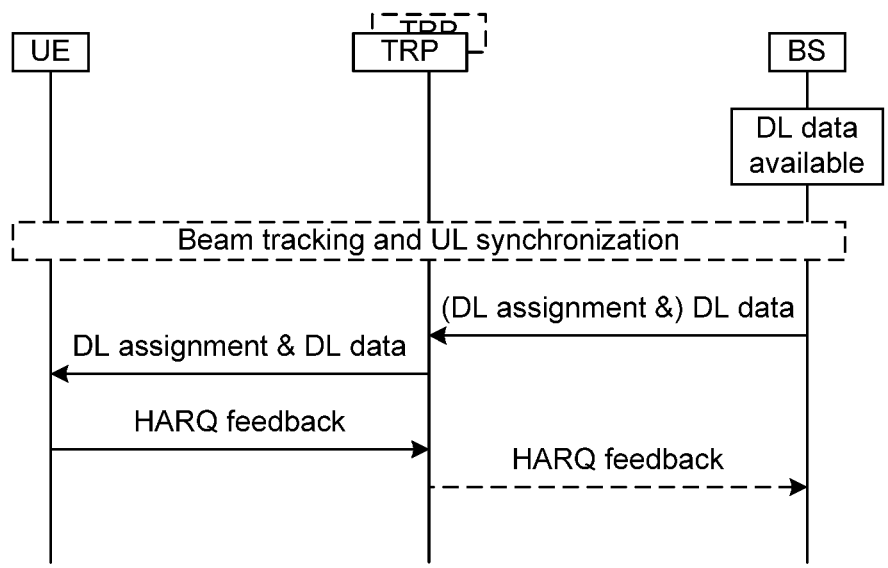
FIG. 18 illustrates one example of a flow chart for downlink transmission.

FIG. 18 illustrates an example of a flow chart for DL data transmission.

When the UE is in connected state, the UE may move among different beams or different TRPs of the same serving cell. Besides, if UE beamforming is used, UE beam(s) may also change over time, e.g. due to UE rotation.

A case of mobility in connected state without cell change has the following steps:
Configuration of signaling for change detection
  The change of UE beam(s), serving beam(s) of serving TRP(s), and serving TRP(s) may be detected by the UE and/or the network. In order to detect the change, a signaling periodically transmitted by TRP(s) or the UE could be a baseline approach. The configuration of the signaling should be configured to let the UE know how and when to transmit or receive the signaling.
Signaling for change detection
  One or more TRPs periodically perform beam sweeping for the reception or transmission of the signaling. If UE beamforming is used, the UE periodically performs beam sweeping for reception or transmission of the signaling.
UE beam change
  If UE beam change is detected by the UE, the UE itself may select the proper UE beam(s) for the following reception (and/or transmission, e.g. for TDD). Alternatively, the UE needs to provide feedback to the network, e.g. periodically or upon detection of the change, and the network could provide an indication of the UE beam change from the network to the UE. Then, the UE may use the UE beam(s) indicated by the network for the following transmission and/or reception.
  If the change is to be detected by network, the indication of the UE beam change from the network to the UE may be required, e.g. periodically or upon detection of the change. The UE uses the UE beam(s) indicated by the network for the following transmission (and/or reception, e.g. for TDD).

It is possible that the change may not be detected or updated timely and it would result in beam tracking failure.

Serving beam and/or serving TRP change

After the UE receives the signaling for change detection, the UE needs to provide feedback to the network, and the network could decide whether to change (DL) serving beam(s) and/or serving TRP(s) for the UE.

On the other hand, after the TRP(s) receives the signaling for a change detection, the network can decide whether to change the serving beam(s) and/or the serving TRP (s) for the UE. The indication from the network to the UE about (DL) serving beam/TRP change may be required.

It is possible that the change may not be detected or updated timely, which would result in beam tracking failure.

Figure 19:
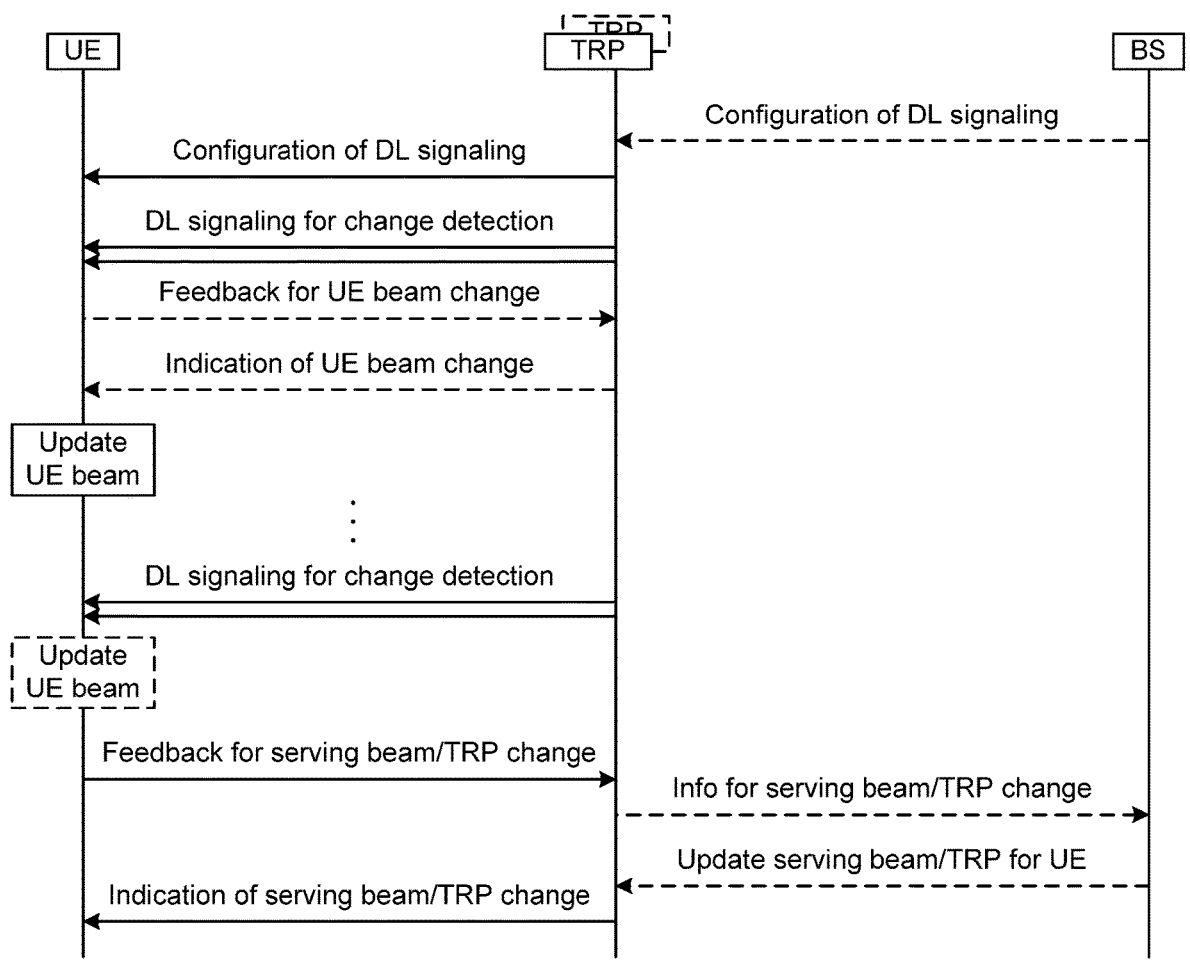
FIG. 19 illustrates one example of a flow chart for mobility in a connected state without cell change (based on UE detection).
Figure 20:
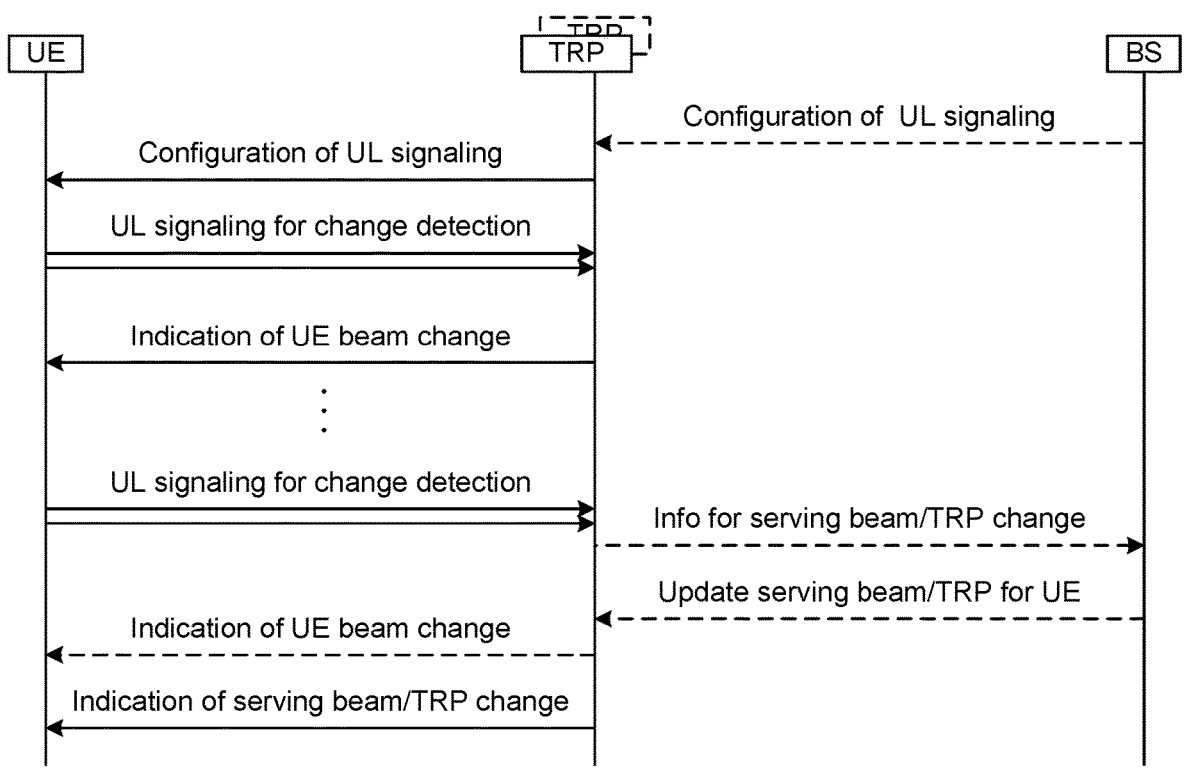
FIG. 20 illustrates one example of a flow chart for mobility in a connected state without cell change (based on network detection).

FIGS. 19 and 20 illustrate examples of flow charts for mobility in connected state without cell change.

It is possible that a UE could generate one or more UE beams at the same time. The most proper UE beam(s) used to communicate with network, e.g. a TRP, may change from time to time, e.g. due to UE mobility. Accordingly, methods for deciding which UE beam(s) to be used to transmit or receive a UL or DL transmission are needed.

For transmissions scheduled dynamically, the UE beam(s) to be used could be dynamically assigned by network, e.g. via associated scheduling information. However, for transmissions via pre-allocated radio resources, e.g. which is not scheduled dynamically with associated scheduling information, which UE beam(s) is used should be specified.

Transmission via pre-allocated radio resources may occur periodically (e.g. periodic measurement report from UE) or occur at the timing which may not be predictable by receiver of the transmission (e.g. scheduling information transmission from network may occur during Active Time as defined in 3GPP TS 36.321 V13.0.0). The UE may not need to perform UE beam sweeping to transmit or receive the transmission. The transmission could be transmitted or received in a time interval where network would perform beam sweeping, e.g. in DL or UL sweeping subframe as discussed in 3GPP R1-165364.

Transmission via pre-allocated radio resources could be one or multiple of following signaling:
- (UL) Periodic measurement feedback or report, e.g. like Channel Quality Indicator (CQI) or Channel State Information (CSI) in LTE;
- (UL) Scheduling request;
- (UL) Semi-persistent scheduling transmissions;
- (DL) Semi-persistent scheduling transmissions;
- (DL) Periodic DL signal for beam and/or TRP maintenance/change, e.g. indicating candidate of UE beam(s), network beam(s), and/or TRP(s); or
- (DL) Scheduling information for DL assignment or UL resource, e.g. like Physical Downlink Control Channel (PDCCH) signal in LTE.

In a cell or for a TRP, the UE may or may not use different UE beams or more than one UE beam to transmit or receive the transmission. For example, the UE could use the same UE beam(s) to transmit or receive some or all of the above signaling in a cell or for a TRP. For different TRPs, the UE may use different UE beams to transmit or receive transmissions via pre-allocated radio resources.

The UE beam(s) used for the transmission via pre-allocated radio resources may be called special UE beam(s). UE beam(s), such as special UE beam(s), used for the transmission via pre-allocated radio resources in a cell or for a TRP could initially be the UE beam(s) used or assigned during a random access procedure for initial access or handover. Special UE beam(s) for transmitting and special UE beam(s) for receiving may be the same or different.

Figure 21:
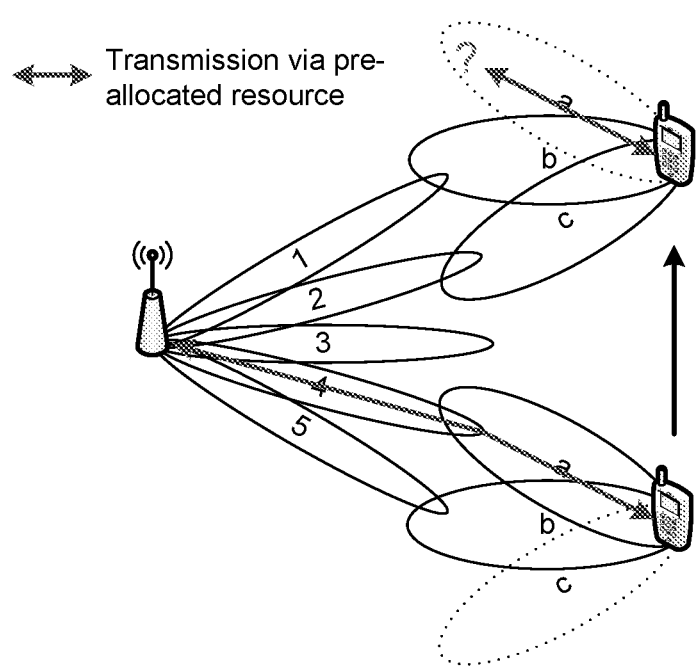
FIG. 21 illustrates one example of UE beam change.
Figure 22:
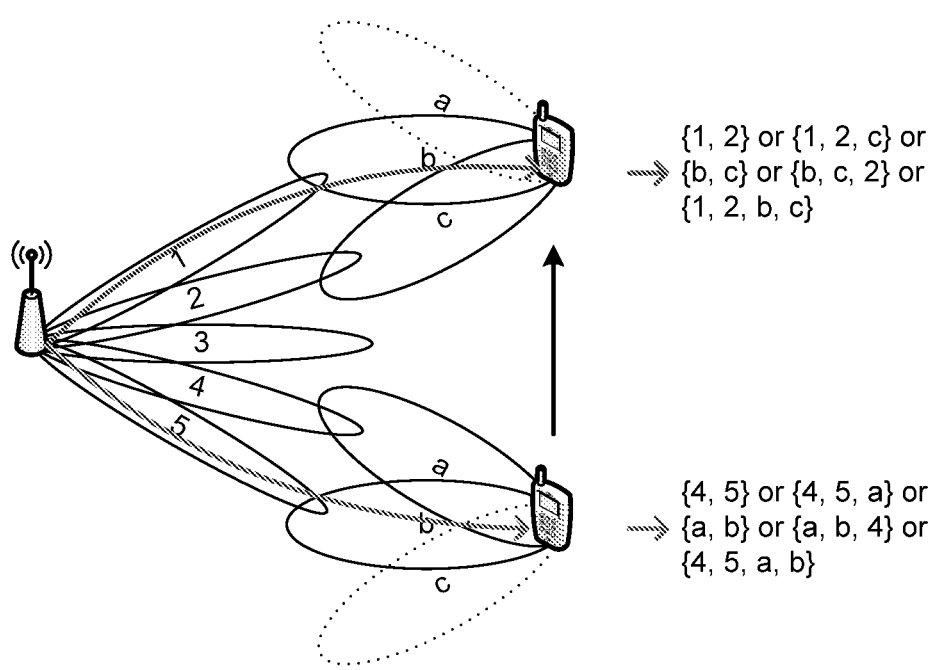
FIG. 22 illustrates one example for determining UE beam candidates.
Figure 23:
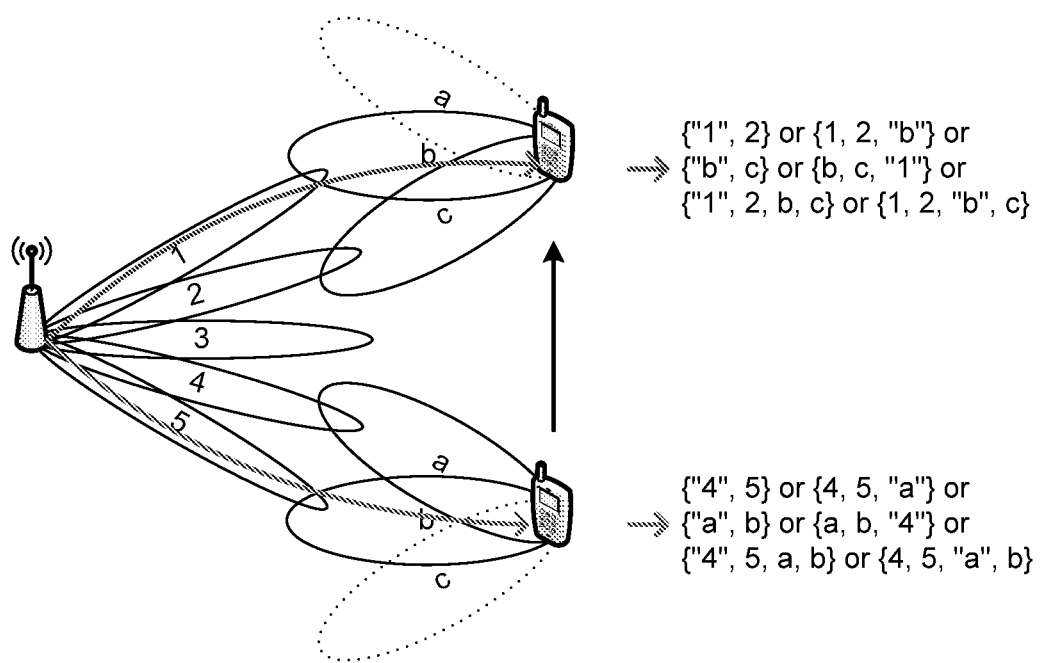
FIG. 23 illustrates one example for determining one or more special UE beams.

Several methods are considered below to decide UE beam(s) to transmit or receive a transmission via pre-allocated radio resources in a cell or for a TRP. In one method, the network chooses at least one special UE beam for the transmission. The network could change or update the special UE beam(s) (e.g., based on a measurement result and/or scheduling decision) via a periodic or non-periodic indication to the UE (e.g., indication of beam change). The indication could indicate which UE beam(s) and/or network beam(s) could be candidate(s) for communication with the network and indicate explicitly or implicitly which UE beam(s) is the special UE beam(s). FIGS. 22 and 23 are examples of indicating UE beam candidates and/or special UE beam. The special UE beam(s) could be implicitly indicated by where the indication is received. For example, after the UE moves as shown in FIG. 21, the network can indicate to the UE that beams b and c are candidates and that beam b is the special UE beam by providing the special UE beam indication via beam 1 with the indication being received by the UE via beam b.

In another method, the network chooses at least one special network beam for the UE to determine at least one special UE beam for the transmission. The network could provide an indication to indicate at least one network beam to the UE. The indicated network beam(s) in the indication may be called special network beam(s). The UE may determine the special UE beam(s) by measuring signal of the special network beam(s). For example, the UE beam(s) with received power larger than a threshold or UE beam with largest received power may be determined to be the special UE beam(s) by measuring the signal of the special network beam(s). By this way, the mapping between the UE beam(s) and the network beam(s) is known to the UE. The mapping between UE beam(s) and network beam(s) could mean that transmissions from which UE beam(s) can be received from which network beam(s), and/or transmissions from which network beam(s) can be received from which UE beam(s). Alternatively, the mapping between the UE beam(s) and the network beam(s) may be provided by the network. The UE then can determine the special UE beam(s) based on the special network beam(s) and the mapping.

The network can change or update the special network beam(s) (e.g., based on a measurement result and/or a scheduling decision) via a periodic or non-periodic indication to the UE (such as an indication of beam change). The indication can indicate which UE beam(s) and/or network beam(s) could be candidate(s) for communication with the network and indicate explicitly or implicitly which network beam(s) is/are the special network beam(s). FIGS. 22 and 23 are examples of indicating UE beam candidates and/or special UE beam. Alternatively, the indication could indicate information (such as, but not limited to, configuration) related to the signal of the special network beam(s) to be measured (e.g., Beam specific reference signal (BRS)). The special network beam(s) could be implicitly indicated by where the indication is transmitted. For example, after the UE moves as shown in FIG. 21, the network could indicate to the UE that beams b and c are candidates and beam 1 is the special network beam by providing the special UE beam indication via beam 1.

In another method, the UE determines at least one special UE beam for the transmission.

The UE determines the special UE beam(s) based on a measurement, e.g. UE beam(s) with a measured quality better than a threshold or an UE beam with best measured quality. The special UE beam(s) could be part of the UE beam candidate(s), such as those indicated by the network.

Based on the measurement, the network could predict the special UE beam(s) determined by the UE. In case that prediction may not be accurate or it is not predictable, the network could perform beam sweeping to transmit or receive the transmission.

In another method, the UE uses all of UE beam candidates for the transmission.

The UE determines the UE beam candidates based on a measurement, e.g. UE beam(s) with measured quality better than a threshold or UE beam with best measured quality. Alternatively, the UE derives UE beam candidates based on information provided by a network, e.g., the information of UE beam set.

The UE may use all the UE beam candidates to transmit or monitor the transmission at the same time.

The UE beam candidates may be for the same cell or TRP.

The indication of the special UE or network beam(s) and a configuration related to transmissions via pre-allocated radio resources may be provided via different signaling, e.g. to save signaling overhead because the configuration does not need to be changed frequently. The indication could be carried by Medium Access Control (MAC) or Physical (PHY) signaling. The configuration could be carried by a Radio Resource Control (RRC) message. The configuration could be used to indicate or be used by the UE to determine the radio resources, transmission timing, frequency resources, and/or periodicity for the transmission. The configuration could be used to indicate information for the UE to determine which UE beam(s) to be used to receive or transmit the transmission associated with the configuration, e.g. whether to use special UE beam(s) or all of the UE beam candidates for the transmission.

A network or UE beam candidate can be a beam that is qualified, e.g., with an associated measured result larger than a threshold, and it can be used for communication between the UE and the network, e.g. a cell or a TRP. The number of beam candidates may be less than the number of maximum beams which could be generated concurrently. Furthermore, the UE beam candidates may be the UE beams which can be generated concurrently. The beam candidate(s) could be (periodically) indicated from the network to the UE.

The number of UE beams used for different kinds of transmission via pre-allocated radio resources may be different. For example, a portion of the UE beam candidates, such as special UE beam(s), are used for a first transmission via pre-allocated radio resources, (e.g. Semi-Persistent Scheduling (SPS)), and all of the UE beam candidates are used for a second transmission via pre-allocated radio resources such as, but not limited to, scheduling information.

A beam may be explicitly indicated and differentiated by a beam specific configuration (e.g. index, a resource for the beam, or a precoding matrix).

According to one method, a UE receives a second signal indicating a first information. The UE derives at least one specific UE beam based on the first information. The UE uses the at least one specific UE beam to receive or transmit at least one transmission, in which the at least one transmission is periodic channel state indication, scheduling request, and/or scheduling information for downlink assignment or uplink resource. The first information is associated with at least one specific network beam.

In another method, the UE receives a first signal indicating radio resources for at least a transmission or indicating a configuration to determine the radio resources for the at least a transmission. The UE receives a second signal indicating a first information to derive at least one specific UE beam used to receive or transmit the at least a transmission via the radio resources. The UE uses the at least one specific UE beam to receive or transmit the at least a transmission.

In yet another method, the UE receives a first signal indicating radio resources for at least a transmission or indicating a configuration to determine the radio resources for the at least a transmission. The UE determines at least one specific UE beam used to receive or transmit the at least a transmission via the radio resources. The UE uses the at least one specific UE beam to receive or transmit the at least a transmission.

In another aspect, the methods are directed to a network node. According to one method, the network node selects at least one specific network beam. The network node transmits a second signal to a UE to indicate a first information for the UE to derive at least one specific UE beam used to receive or transmit at least one transmission. The network node uses the at least one specific network beam to transmit or receive the at least one transmission, wherein the at least one transmission is a periodic channel state indication, scheduling request, and/or a scheduling information for a downlink assignment or an uplink resource. The first information is associated with the at least one specific network beam.

In another method, the network node transmits a first signal indicating radio resources for at least a transmission or indicating a configuration for a UE to determine the radio resources for the at least a transmission. The network node transmits a second signal indicating a first information for the UE to derive at least one specific UE beam used to receive or transmit the at least a transmission via the radio resources.

In some methods, the UE is able to generate more than one UE beam at the same time.

In some methods, the transmission is done via a DL control channel (e.g., physical downlink control channel (PDCCH)), DL data channel (e.g., physical downlink shared channel (PDSCH)), UL control channel (e.g., physical uplink control channel (PUCCH)), or a UL data channel (e.g., physical uplink shared channel (PUSCH)).

In some methods, the transmission is used to transmit a period measurement feedback, periodic measurement report, channel quality indicator report, channel state information report, or a scheduling request. In some methods, the transmission is used to transmit a periodic DL signal for beam maintenance or beam change. Alternatively, the transmission is used to transmit a periodic DL signal for TRP maintenance or TRP change.

In some methods, the transmission is a semi-persistent scheduling transmission.

In some methods, the transmission is used to indicate a candidate of one or more UE beams, a candidate of one or more network beams, a candidate of one or more TRPs, scheduling information for DL assignments, or scheduling information for UL resources.

In some methods, the transmission is not scheduled dynamically. The transmission is done via pre-allocated, pre-scheduled, or pre-determined radio resources. In some methods, the UE doesn't perform UE beam sweeping for the transmission.

In some methods, the transmission occurs when it is triggered by the UE. Alternatively or additionally, the transmission occurs periodically. Alternatively or additionally, the transmission occurs in a time interval where the network uses beam sweeping. Alternatively or additionally, the transmission occurs in a DL or UL sweeping subframe.

In some methods, the UE uses one specific UE beam to transmit or receive the transmission. Alternatively, the UE uses more than one specific UE beam to transmit or receive the transmission.

In some methods, the UE uses one or more different, specific UE beams to transmit or receive the transmission associated with different TRPs. The UE uses the same specific UE beam(s) to transmit or receive the transmission associated with one TRP.

In some methods, the UE uses different specific UE beam(s) for different kinds of the transmissions. Alternatively, the UE uses the same specific UE beam(s) for all kinds of the transmissions associated with one TRP.

In some methods, the specific UE beam is a special UE beam.

In some methods, the UE (initially) uses the UE beam(s) used or assigned during a random access procedure for the transmission. The random access procedure may be for initial access or for handover. In some methods, the specific UE beam(s) used for transmitting is the same the specific UE beam(s) for receiving. Alternatively, the specific UE beam(s) used for transmitting is different from the specific UE beam(s) for receiving.

In the various methods, the second signal is used for change or update of the specific UE beam(s). Alternatively or additionally, the second signal is used to change or update the specific network beam(s). The second signal is transmitted periodically.

In the various methods, the first information indicates which UE beam(s) and/or network beam(s) could be candidate(s) for communication with the network. The first information indicates which UE beam(s) is the specific UE beam(s) explicitly. Alternatively, the first information indicates which UE beam(s) is the specific UE beam(s) implicitly, e.g., the UE beam(s) where the first information is received.

In some methods, the UE derives the specific UE beam(s) based on at least one specific network beam(s). The UE derives the specific UE beam(s) by measuring at least one specific network beam(s). The specific UE beam(s) can be the UE beam(s) having a received power larger than a threshold or the UE beam with the largest received power. The UE can derive the specific UE beam(s) based on a mapping between the UE beam(s) and the network beam(s). The mapping between the UE beam(s) and the network beam(s) means that transmissions from which UE beam(s) could be received from which network beam(s) and/or transmissions from which network beam(s) could be received from which UE beam(s).

Based on the various methods, the specific network beam is a special network beam.

The first information indicates which network beam(s) is the specific network beam(s) explicitly. Alternatively the first information implicitly indicates which network beam(s) is the specific network beam(s). For example, the specific network beam(s) is the network beam(s) where the first information is transmitted. The first information can indicate which network beam or beams are associated with the specific UE beam or beams. In some methods, the first information indicates a configuration related to a signal of the specific network beam or beams to be measured (such as BRS). The first information may be applicable to more than one transmission. The first information may be applicable before it is updated or becomes invalid.

In some methods, the UE determines the specific UE beam(s) based on a measurement. For example, one or more UE beams are determined as one or more specific UE beams if the UE beam(s) has a measured quality better than a threshold value or the UE beam has the best measured quality. In some methods, the specific UE beam(s) is part of the UE beam candidate(s) (as indicated by the network node).

In some methods, the network node predicts the specific UE beam(s) based on a measurement. The network node can use beam sweeping to transmit or receive the transmission.

In the disclosed methods, the specific UE beam(s) includes all of the UE beam candidate(s). The UE can determine the UE beam candidate(s) based on a measurement. For example, one or more UE beams are determined as one or more UE beam candidates if the UE beam(s) has a measured quality better than a threshold value or the UE beam has the best measured quality. The UE derives the UE beam candidate(s) based on information provided by the network such as the information of the UE beam set.

In the disclosed methods, the UE uses all of the UE beam candidate(s) to transmit or monitor the transmission. The UE beam candidates are for the same cell or for the same TRP. The first and second signals may be provided via different signaling. The second signal may be carried by MAC signaling or PHY signaling. The first signal may be carried by a RRC message such as, but not limited to, connection reconfiguration message.

In the disclosed methods, the radio resources include the timing of the transmission, frequency resources of the transmission, and/or periodicity of the transmission. The radio resources can include the resources used by the UE for the transmission, the resource candidates for the transmission, the resources monitored or searched by the UE for the transmission, and/or the resources allowed to be used by the UE for the transmission.

In the disclosed methods, the configuration includes DL bandwidth, PHICH configuration, and/or the UE identity such as, but not limited to, C-RNTI. The UE beam candidate or a network beam candidate is a beam that is qualified and is possible to be used for communication between a UE and a network such as, but not limited to, a cell or TRP.

In the disclosed methods, a qualified beam means a beam with an associated measured result larger than a threshold. The number of UE beam candidates may be less than the number of maximum UE beams which could be generated concurrently. The number of network beam candidates may be less than the number of maximum network beams which could be generated concurrently. In the disclosed methods, the UE beam candidates are those UE beams which can be generated concurrently.

The UE beam candidates and/or the network beam candidates can be indicated from the network to the UE. Alternatively, the UE beam candidates and/or the network beam candidates can be indicated periodically from the network to the UE.

In the disclosed methods, the number of UE beams used for different kinds of the transmission via pre-allocated radio resources is different. The beams may be differentiated by per beam specific configuration (such as an index, a resource for a beam, or a precoding matrix).

In the disclosed methods, the UE may be in connected mode or connected state. The transmission may be UE specific. In the disclosed methods, the network node may be a TRP, base station, or a 5G node.

Figure 24:
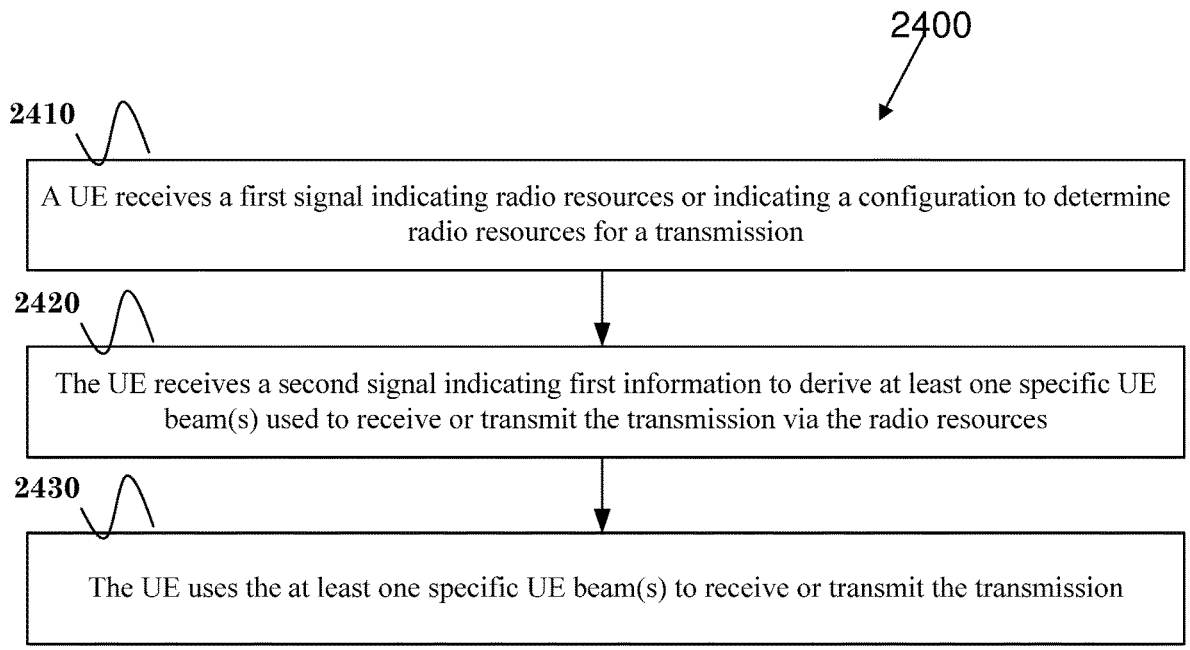
FIG. 24 illustrates one exemplary flow chart of one embodiment.
Figure 25:
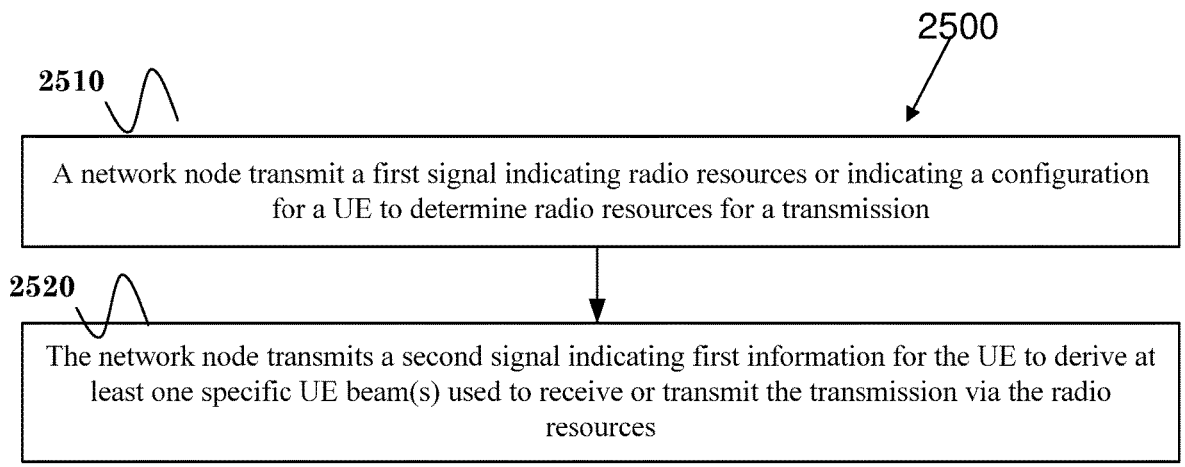
FIG. 25 illustrates one exemplary flow chart of one embodiment.
Figure 26:
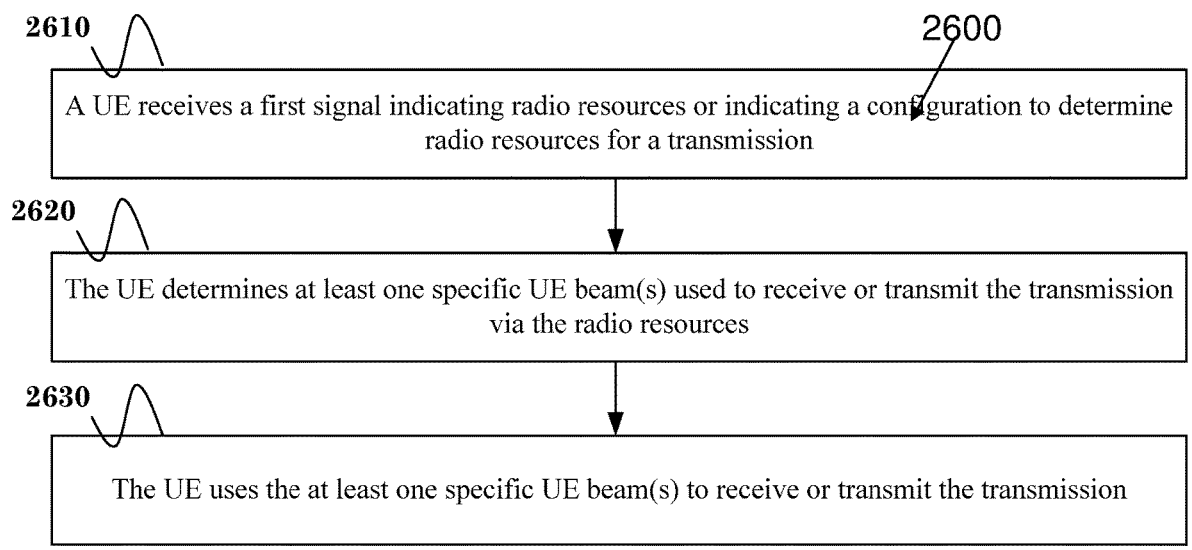
FIG. 26 illustrates one exemplary flow chart of one embodiment.

Various methods 2400, 2500, 2600 are illustrated in FIGS. 24-26. In FIG. 24, at step 2410, the UE receives a first signal indicating radio resources for a transmission or indicating a configuration to determine the radio resources for the transmission. At step 2420, the UE receives a second signal indicating a first information to derive at least one specific UE beam used to receive or transmit the transmission via the radio resources. At step 2430, the UE uses the at least one specific UE beam to receive or transmit the transmission.

In FIG. 25, at step 2510, a network node transmits a first signal indicating radio resources for a transmission or indicating a configuration for a UE to determine the radio resources for the transmission. At step 2520, the network node transmits a second signal indicating a first information for the UE to derive at least one specific UE beam to be used to receive or transmit the transmission via the radio resources.

In FIG. 26, at step 2610, a UE receives a first signal indicating radio resources for a transmission or indicating a configuration to determine the radio resources for the transmission. At step 2620, the UE determines at least one specific UE beam used to receive or transmit the transmission via the radio resources. At step 2630, the UE uses the at least one specific UE beam to receive or transmit the transmission.

A network can indicate to a UE about UE beam(s) to be used for a transmission or reception by the UE, possibly together with scheduling information for the transmission or reception, e.g. in physical layer signaling like PDCCH in LTE, to enable efficient scheduling.

For a Time Division Duplex (TDD) mode, it is likely that both the UE and the network, e.g. TRP or eNB, use the best UE beam and the best eNB beam to communicate with each other during the random access procedure. The best beam can be the beam with the best measured quality. In this situation, the exchange of beam information between the UE and the network during the random access procedure may not be needed, and the UE can just use the same beam for communicating with the network after the random access procedure. In other words, the network may not be aware of the UE beam used during the random access procedure and thus will not include an explicit UE beam indication in the scheduling information before the network is aware of the UE beams based on beam finding and/or beam tracking.

Therefore, the following two cases should be supported for scheduling information provision:
(1) The scheduling information includes information carrying at least one value for indicating UE beam(s) to be used for communication with the network.
   Upon receiving the scheduling information indicating UE beam(s), the UE uses the indicated UE beam(s) for the transmission or the reception indicated by the scheduling information.
(2) The scheduling information does not include information carrying any value for indicating UE beam(s) to be used for communication with the network. Alternatively, the scheduling information includes information carrying a special value which does not correspond to any valid UE beam (e.g., 4 bits are used to indicate UE beams. 0000~0111 correspond to 8 valid UE beams and 1111 could be the special value).
   Upon receiving the scheduling information without indicating UE beam(s), the UE should have some means to determine which UE beam(s) to be used for the transmission or the reception indicated by the scheduling information. Several alternatives can be considered in the following:
   The UE beam(s) with the best measured quality, e.g. in the latest measurement, can be used.
   The UE beam(s) used in the last transmission or the last reception can be used.
   The UE beam(s) where the scheduling information is received can be used.
   The UE beam(s) of the currently maintained beam set, e.g. based on beam tracking process, can be used.

Referring back to FIGS. 3 and 4, in one embodiment, the device 300 includes a program code 312 stored in memory 310. The CPU 308 could execute program code 312 to enable the UE (i) to receive a second signal indicating a first information; (ii) to derive at least one specific UE beam based on the first information; and (iii) to use the at least one specific UE beam to receive or transmit at least one transmission, wherein the at least one transmission is periodic channel state indication, scheduling request, and/or scheduling information for downlink assignment or uplink resource.

In another embodiment, the CPU 308 could execute program code 312 to enable the network node (i) to select at least one specific network beam; (ii) to transmit a second signal to a UE to indicate a first information for the UE to derive at least one specific UE beam used to receive or transmit at least one transmission; and (iii) to use the at least one specific network beam to transmit or receive the at least one transmission, wherein the at least one transmission is periodic channel state indication, scheduling request, and/or scheduling information for downlink assignment or uplink resource.

Furthermore, the CPU 308 can execute the program code 312 to perform all of the above-described actions and steps or others methods described herein.

Based on the invention, UE beam(s) to be used for transmissions via pre-determined radio resources can be controlled efficiently.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of user equipment (UE) for transmission or reception using beamforming, the method comprising:
    deriving a UE beam by measuring a beam reference signal of a network beam based on first information associated with the network beam, wherein the first information indicates a configuration related to the beam reference signal of the network beam to be measured; and
    using, by the UE, the UE beam to transmit a periodic Channel State Information (CSI) and to transmit a scheduling request.

2. The method of claim 1, further comprising:
    receiving a signal indicating radio resources for the beam reference signal and the periodic CSI.

3. The method of claim 2, wherein the signal is a Radio Resource Control (RRC) message.

4. The method of claim 1, further comprising:
    receiving an indication of candidates of network beams for communication with a network node.

5. A method of a network node for transmission or reception using beamforming, the method comprising:
    selecting a network beam;
    transmitting a first signal to a user equipment (UE) to indicate a first information associated with the network beam for the UE to derive a UE beam used to transmit a periodic Channel State Information (CSI) and to transmit a scheduling request, wherein the first information indicates a configuration related to a beam reference signal of the network beam to be measured; and
    receiving the periodic CSI and the scheduling request via the UE beam.

6. The method of claim 5, further comprising:
    transmitting a second signal indicating radio resources for a beam reference signal of the network beam and the periodic CSI.

7. The method of claim 6, wherein the second signal is a Radio Resource Control (RRC) message.

8. The method of claim 5, further comprising:
    transmitting, to the UE, an indication of candidates of network beams for communication with the network node.

9. A User Equipment (UE) for transmission or reception using beamforming comprising:
    a control circuit;
    a processor installed in the control circuit; and
    a memory installed in the control circuit and coupled to the processor;
    wherein the processor is configured to execute a program code stored in the memory to:

derive a UE beam by measuring a beam reference signal of a network beam based on first information associated with the network beam, wherein the first information indicates a configuration related to the beam reference signal of the network beam to be measured; and use, by the UE, the UE beam to transmit a periodic Channel State Information (CSI) and to transmit a scheduling request.

10. The UE of claim 9, wherein the processor is further configured to:

receive a signal indicating radio resources for the beam reference signal and the periodic CSI.

11. The UE of claim 10, wherein the signal is a Radio Resource Control (RRC) message.

12. The UE of claim 9, wherein the processor is further configured to:

receive an indication of candidates of network beams for communication with a network node.

13. A network node for transmission or reception using beamforming comprising:

a control circuit;

a processor installed in the control circuit; and a memory installed in the control circuit and coupled to the processor;

wherein the processor is configured to execute a program code stored in the memory to:

select a network beam;

transmit a first signal to a user equipment (UE) to indicate a first information associated with the network beam for the UE to derive a UE beam used to transmit a periodic Channel State Information (CSI) and to transmit a scheduling request, wherein the first information indicates a configuration related to a beam reference signal of the network beam to be measured; and receiving the periodic CSI and the scheduling request via the UE beam.

14. The network node of claim 13, wherein the processor is further configured to:

transmit a second signal indicating radio resources for a beam reference signal of the network beam and the periodic CSI.

15. The network node of claim 14, wherein the second signal is a Radio Resource Control (RRC) message.

16. The network node of claim 13, wherein the processor is further configured to:

transmit, to the UE, an indication of candidates of network beams for communication with the network node.

* * * * *